Aug. 11, 1931.  E. H. STEEDMAN  1,818,016
SAFETY MECHANISM FOR AUTOMOBILE LIFTS
Filed May 5, 1930  3 Sheets-Sheet 1
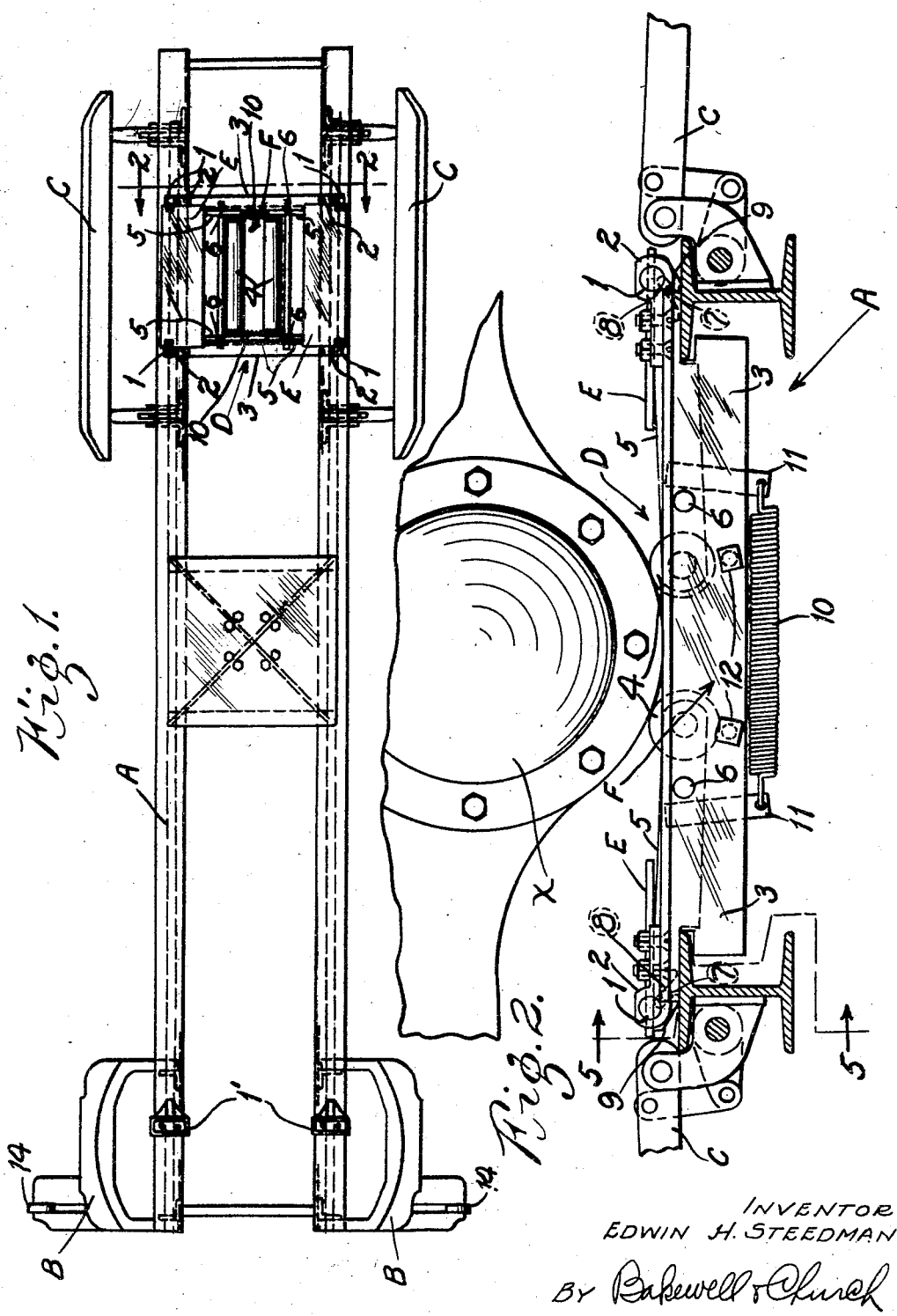
INVENTOR:
EDWIN H. STEEDMAN
By Bakewell & Church
ATTORNEYS

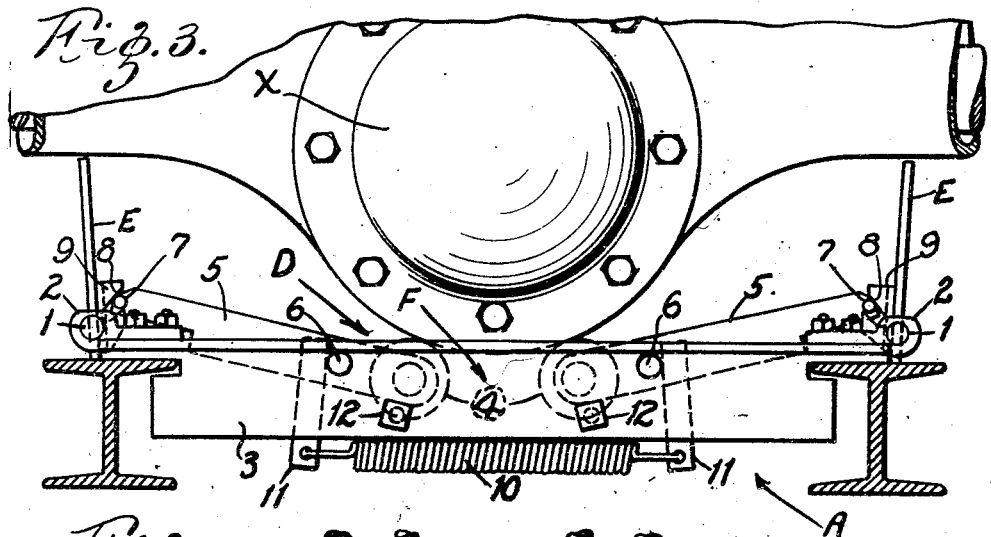
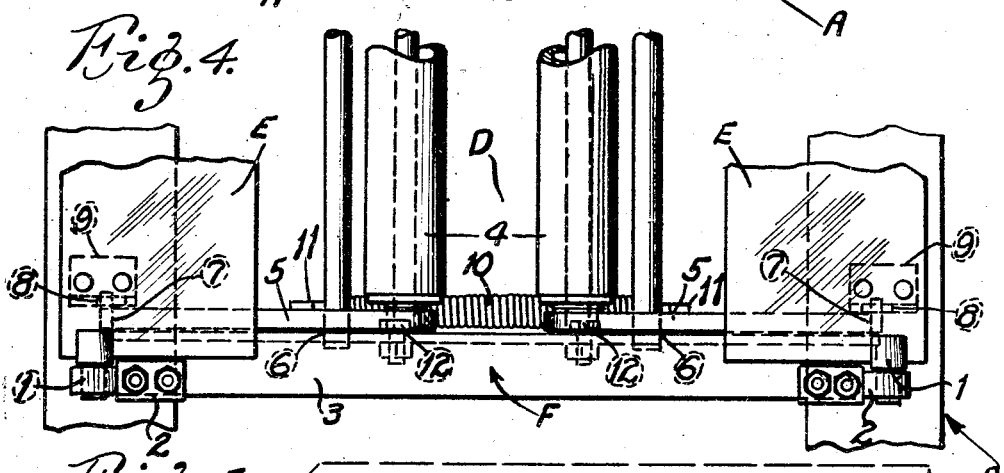
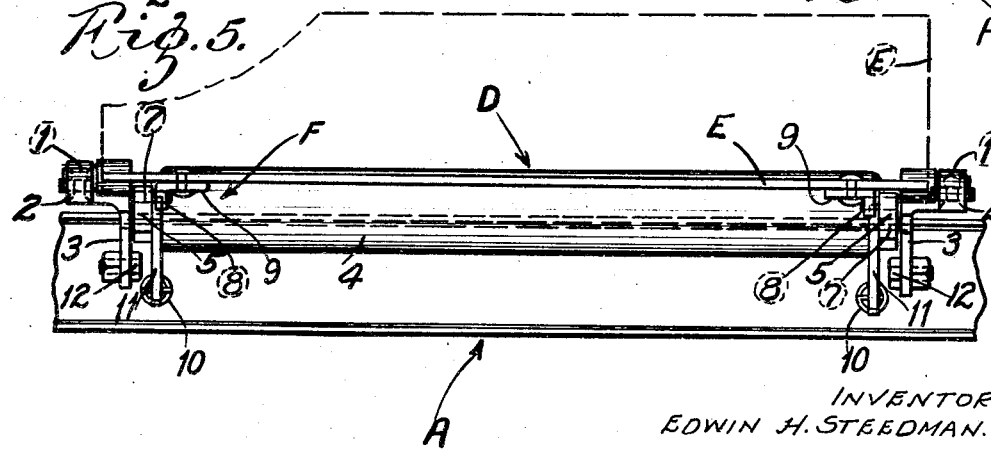

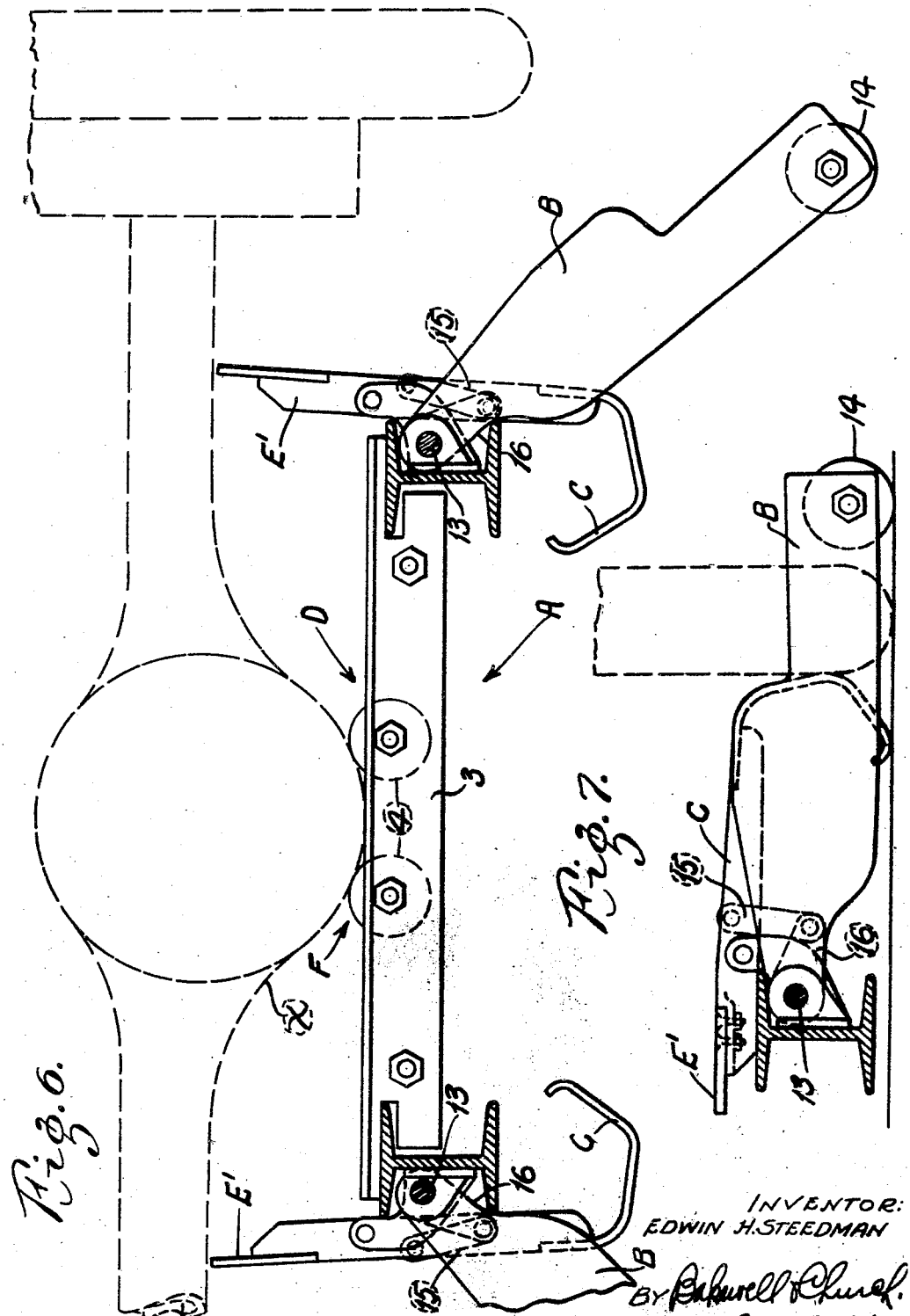

Patented Aug. 11, 1931

1,818,016

UNITED STATES PATENT OFFICE

EDWIN H. STEEDMAN, OF ST. LOUIS, MISSOURI, ASSIGNOR TO CURTIS MANUFACTURING COMPANY, OF WELLSTON, MISSOURI, A CORPORATION OF MISSOURI

SAFETY MECHANISM FOR AUTOMOBILE LIFTS

Application filed May 5, 1930. Serial No. 449,846.

This invention relates to automobile lifts, and has for its main object to provide an efficient safety mechanism of novel design for preventing an automobile from tilting relatively to the platform of the lift when the platform is moving upwardly or is sustained in an elevated position.

Another object is to provide an automobile lift, which, in addition to having chassis engaging devices disposed in substantially triangular relation so as to cause an automobile to have a three point bearing on the platform, is equipped with anti-tilting members that are adapted to shift or be shifted into and out of an active position, wherein said members effectively eliminate the possibility of the automobile on the platform tilting or dropping off, due to an unbalanced condition of the automobile, resulting from any cause, as, for example, from mal-alignment of the central chassis engaging device on the platform and the portion of the chassis of the automobile with which said device contacts, or from several persons standing on one running board of the automobile.

And still another object of my invention is to provide a novel means for causing the anti-tilting members of an automobile lift of the kind just mentioned to be shifted automatically into their active position at the beginning of or during the upward movement of the platform of the lift, and to be restored automatically to their inactive position during or at about the completion of the downward movement of the platform.

Figure 1 of the drawings is a top plan view of an automobile lift equipped with a safety mechanism constructed in accordance with my invention.

Figure 2 is an enlarged transverse sectional view, taken on the line 2—2 of Figure 1, looking in the direction indicated by the arrows, illustrating the position of the central chassis engaging device on the platform before said device is subjected to the weight or load of the rear end portion of an automobile.

Figure 3 is a view similar to Figure 2, illustrating how the anti-tilting members move automatically into their active position when the weight or load of an automobile is exerted on the central chassis engaging device on the platform.

Figure 4 is a fragmentary top plan view of the cradle and the central chassis engaging device and anti-tilting members mounted on the cradle.

Figure 5 is a side view of the cradle and chassis engaging device, looking in the direction of the arrows 5—5 in Figure 2.

Figure 6 is a transverse sectional view through the platform of the lift, looking rearwardly, illustrating another form of my invention and showing the anti-tilting members in their active position; and Figure 7 is a fragmentary view similar to Figure 6, illustrating one of the anti-tilting members in its inactive or inoperative position.

In the accompanying drawings which illustrate my invention, A designates the upwardly-movable platform of an automobile lift of the type in which the platform is adapted to be raised and lowered, by admitting an operating medium to and from a vertically-disposed cylinder mounted in a base beneath the platform and provided with a piston whose upper end is connected to the platform A, said piston and cylinder being omitted from the drawings, as it is immaterial, so far as my present invention is concerned, what type or kind of means is used to raise and lower the platform. The platform A may be of any preferred construction, but it will usually consist of a relatively long and narrow frame of less than the tread of the conventional automobile. Said platform may or may not be equipped with front and rear wheel engaging members B and C that are adapted to co-act with the wheels, preferably the inner sides of the tires of the wheels, to substantially center the automobile with relation to the platform A when the automobile is driven or moved over the platform preparatory to raising the platform.

The platform A of the lift is preferably equipped with chassis engaging devices arranged so as to provide a three point contact or bearing for the automobile mounted on or sustained by the platform. Usually, said chassis engaging devices will consist of two elements 1' arranged adjacent one end of the platform A that are adapted to contact with the front axle of the automobile, and a central chassis engaging device arranged at the opposite end of the platform and designated as an entirety by the reference character D, that is adapted to contact with the differential case x on the rear axle housing of the automobile so as to substantially center the automobile with relation to the platform when said central chassis engaging device D comes into engagement with the differential case x at the beginning of the upward movement of the platform. While my invention is particularly applicable to automobile lifts of the kind in which the vertically-movable platform has three points of contact with the chassis of the automobile that is to be raised and sustained in an elevated position, due to the fact that the anti-tilting members restrict the rocking movement of the automobile on the central chassis engaging device, the invention is not limited to use with an automobile lift platform equipped with chassis engaging devices arranged in triangular relation.

The anti-tilting members and the central chassis-engaging device with which they co-operate can be mounted directly on the platform A and made long enough so as to co-operate properly with the rear axle housings of automobiles having wheel bases of various lengths, or the anti-tilting members and central chassis engaging device can be mounted on a sled, cradle or similar shiftable element on the platform A that is adapted to be moved longitudinally of the platform into various positions according to the length of the wheel base of the automobile that is to be raised. The shape and form of the anti-tilting members and the way in which they are mounted for movement is also immaterial and various kinds of operating mechanisms may be employed for shifting said members into and out of their active position. In the form of my invention illustrated in Figure 1 the anti-tilting members E consist of rockable members of plate-like form provided with horizontally-disposed trunnions or pivot pins 1 that fit in bearings 2 mounted in the end members 3 of a cradle or sled designated as an entirety by the reference character F, which is capable of being shifted longitudinally of the platform A. The central chassis engaging device D, previously referred to, is mounted on or carried by the cradle F and is preferably composed of a pair of longitudinally-disposed rollers 4 that are mounted in such a way that when the platform A moves upwardly during the operation of raising or lifting an automobile, the rollers 4 will engage the differential case x of the rear axle housing of the automobile, and thus cause said rear axle housing to center itself on the cradle. In order that the anti-tilting members E will be rendered operative automatically or moved automatically into their active position shown in Figure 3 at the beginning of the upward movement of the platform A, and will be restored automatically to their inactive or inoperative position shown in Figure 2 at the completion of the downward movement of the platform, the said rollers 4 are mounted on or supported by levers 5 that are pivotally connected at 6 to the end members 3 of the shiftable cradle F, and combined with springs and stops that cause said levers 5 to be maintained in one position when there is no load on the rollers 4 and to be maintained in a different position when the rear axle housing of the automobile is sustained by the rollers 4. The movement of the levers 5 from one position to the other is utilized to actuate the anti-tilting members E, and while various means may be used for operatively connecting the levers 5 with the anti-tilting members, I prefer to provide each of said levers at its outer end with a laterally-projecting pin 7 that is positioned in an open ended slot 8 formed in a bracket 9 on the underside of the anti-tilting member E with which the lever co-operates. The levers 5 are arranged in pairs at opposite sides of the longitudinal axis of the cradle F, and two contractile springs 10 are attached to rigid depending arms 11 on the levers 5, so as to exert pressure on said levers in a direction to cause them to occupy the position shown in Figure 2 when there is no load on the rollers 4 which constitute the central chassis engaging device of the platform of the lift. During the first part of the upward movement of the platform the rollers 4 engage the differential case of the rear axle housing of the automobile before the wheels of the automobile leave the ground or base of the structure, thereby causing the levers 5 which sustain said rollers to swing downwardly until they are arrested by rigid stops or abutments 12 on the end members 3 of the shiftable cradle, as shown in Figure 3. The resulting upward movement of the outer end portions of the levers 5 causes the pins 7 on said levers to co-act with the bearings 9 on the underside of the anti-tilting members E to move said members upwardly into their active position, wherein said members E act as struts which co-operate with the rear axle housing of the automobile to prevent or restrict the tilting or rocking movement of the automobile on the central chassis engaging device formed by the rollers 4. This movement or shifting of the members E into their active position takes place before the wheels of the automobile are raised from the ground or base of the structure and as the weight of the rear end portion of the automobile is imposed on the rollers 4. During the continued upward movement of the platform the members E remain in their active or upright position, and during the downward movement of the platform said members E remain in their upright position until the platform reaches such a level that the weight or load of the automobile is removed from the rollers 4, whereupon the springs 10 contract and move the levers 5 in a direction to swing the members E downwardly into their inactive or inoperative position shown in Figure 2. From the foregoing it will be understood that the anti-tilting members are rendered operative while the weight of the automobile is being imposed on the platform and before the automobile is lifted, and are rendered inoperative or restored to their inactive position as the weight of the auto is being removed from the platform.

As previously stated, the anti-tilting members may be mounted directly on the vertically-movable platform of the lift instead of on a cradle or similar shiftable element on the platform. Also various other means may be used to render the anti-tilting members active and inactive, it being immaterial, so far as my broad idea is concerned, whether the anti-tilting members are actuated manually by the operator in charge of the apparatus, or are actuated automatically. In Figures 6 and 7 I have illustrated another form of my invention, wherein anti-tilting members E' are pivotally mounted directly on the vertically-movable platform A of the lift and are combined with operating rods 13 that are adapted to be actuated to move said members E' into their active position shown in Figure 6 and into their inactive position shown in Figure 7. The operating rods 13 can either be actuated manually, or they can be combined with a means which will cause said rods to rock automatically in a direction to render the anti-tilting members E' active during the upward movement of the platform, and rock in the opposite direction so as to restore the members E' to their inactive position during the downward movement of the platform. I have shown the operating rods 13 as being rigidly connected with front wheel engaging members B that are pivotally mounted on the platform A in such a way that during the upward movement of the platform said wheel engaging members B will swing downwardly out of contact with the front wheels of the automobile, and during the downward movement of the platform, said front wheel engaging members B will be restored automatically to their active or horizontally-disposed position shown in Figure 7, by contact of rollers 14 on said members with the base of the lift over which the platform A is positioned. The rear wheel engaging members C of the lift are also pivotally mounted on the platform A and are connected by means of links 15 with arms 16 on the operating rods 13, thereby causing the rear wheel engaging members C to be moved positively into and out of their inactive position by the oscillating or rocking movement of the operating rods 13. In order to simplify the construction of the lift and produce a lift whose anti-tilting members E' will be sure to be rendered operative when the rear wheel engaging members C are inoperative, and will be rendered inoperative when said rear wheel engaging members C are restored to their operative or active position, I prefer to rigidly connect the anti-tilting members E' to the rear wheel engaging members C in such a way that they virtually form arms or extensions on the members C that swing upwardly into the position shown in Figure 6 when the platform A is raised, and swing downwardly into the position shown in Figure 7 when the platform is thereafter lowered. As previously stated, however, it is immaterial what type or kind of means is used to actuate the anti-tilting members, and said anti-tilting members may be used either alone or in combination with a means for positioning the automobile relatively to the platform.

Having thus described my invention, what I claim as new and desire to secure by Letters Patent is:

1. An automobile lift, comprising a means that is adapted to engage the chassis of an automobile and move the chassis upwardly into an elevated position, members combined with said means for preventing the chassis from tilting, and means for shifting said anti-tilting members into and out of an active position.

2. An automobile lift, comprising chassis engaging devices that are adapted to move upwardly so as to raise an automobile which has been positioned over said devices, said devices being so arranged that the chassis will have a three point bearing on same, and shiftable anti-tilting members combined with said chassis engaging devices and adapted to be rendered operative at some time in the operation of raising the automobile so as to prevent the automobile from toppling over, due to rocking or tilting on said chassis engaging devices.

3. An automobile lift, comprising a chassis engaging means that is adapted to be moved upwardly so as to engage the chassis of an automobile and move the automobile upwardly into an elevated position, shiftable anti-tilting members combined with said means, and means for causing said anti-tilting members to be rendered operative automatically during the upward movement of said chassis engaging means, and to be restored to their inactive position during the downward movement of said chassis engaging means.

4. An automobile lift, comprising a means that is adapted to be moved upwardly so as to engage the chassis of an automobile positioned over said means and cause said automobile to be raised, said means having a central chassis engaging device and additional chassis engaging devices that form a three point bearing for the chassis, and shiftable anti-tilting members arranged at opposite sides of said central chassis engaging device.

5. An automobile lift, comprising an upwardly-movable means over which an automobile is adapted to be positioned, spaced devices on said means that are adapted to engage the front axle of the automobile, a centrally-disposed device on said means that is adapted to engage the rear axle housing of the automobile, anti-tilting members on said means arranged at opposite sides of said centrally-disposed device, and means for shifting said anti-tilting members into and out of an active position.

6. An automobile lift, comprising an upwardly-movable platform over which an automobile is adapted to be positioned, a chassis engaging device carried by said platform and disposed so that when the platform is in its raised position the central portion of the automobile sustained by the platform will contact with said chassis engaging device, and shiftable anti-tilting members on the platform for restricting the tilting or rocking movement of the automobile on said chassis engaging device.

7. An automobile lift, comprising an upwardly-movable platform over which an automobile is adapted to be positioned, rockable members on said platform that are adapted to coact with the rear axle housing of the automobile to maintain the automobile in proper balance when the platform is in its raised position, and means for rendering said anti-tilting members active and inactive.

8. An automobile lift, comprising an upwardly-movable platform over which an automobile is adapted to be positioned, rockable members on said platform that are adapted to co-act with the rear axle housing of the automobile to maintain the automobile in proper balance when the platform is in its raised position, and means for automatically rendering said anti-tilting members operative during the upward-movement of the platform and for automatically restoring said anti-tilting members to an inoperative position during the downward movement of the platform.

9. An automobile lift, comprising an upwardly-movable platform over which an automobile is adapted to be positioned, spaced chassis engaging devices that are adapted to engage the front axle of the automobile during the upward movement of the platform, a central chassis engaging device carried by the platform and adapted to co-act with the differential case of the rear axle housing of the automobile to tend to center said rear axle housing with relation to the platform during the upward movement of the platform, and shiftable anti-tilting members on said platform that are adapted to be rendered operative so as to co-act with the rear axle housing of the automobile to maintain the automobile in balance when the automobile is in its raised position.

10. An automobile lift, comprising a platform that is adapted to be moved upwardly so as to lift an automobile that has been positioned over said platform, a chassis engaging means on said platform that is adapted to co-act with a central portion of the automobile chassis to tend to center the chassis on the platform when the platform moves upwardly, said means being mounted so as to shift relatively to the platform when the weight or load of the automobile is being imposed on said means; and shiftable anti-tilting members on the platform that are rendered operative by the said movement or shifting of said chassis engaging means.

11. An automobile lift, comprising an upwardly-movable platform over which an automobile is adapted to be positioned, a pair of spaced longitudinally-disposed elements carried by said platform and arranged so as to engage a central portion of the rear axle housing of the automobile during the upward movement of the platform, rockable bearings for said elements, and rockable anti-tilting members carried by the platform and operatively connected with said rockable bearings so as to be shifted into and out of an active position by the movement of said bearings.

12. An automobile lift, comprising an upwardly-movable platform over which an automobile is adapted to be positioned, shiftable anti-tilting members on the platform that are adapted to co-act with a portion of the chassis of the automobile to maintain the automobile in balance when the platform is in its elevated position, and means for automatically rendering said anti-tilting members operative when the weight or load of the automobile is imposed on the platform during the upward movement of the platform.

13. An automobile lift, comprising an upwardly-movable platform over which an automobile is adapted to be positioned, a pair of longitudinally-disposed rollers arranged in spaced relation and adapted to co-act with the differential case of the rear axle housing of the automobile to center the same with relation to the platform when the platform moves upwardly to raise the automobile, pivotally mounted levers that sustain said rollers, and shiftable anti-tilting members operatively connected with said levers and adapted to be rendered active and inactive by the movement of said levers.

14. An automobile lift, comprising an upwardly-movable platform over which an automobile is adapted to be positioned, a pair of longitudinally-disposed rollers arranged in spaced relation and adapted to co-act with the differential case of the rear axle housing of the automobile to center the same with relation to the platform when the platform moves upwardly to raise the automobile, pivotally mounted levers that sustain said rollers, shiftable anti-tilting members operatively connected with said levers and adapted to be rendered active and inactive by the movement of said levers, and springs combined with said levers so as to exert pressure on same in a direction to normally maintain said anti-tilting members in an inactive position.

15. An automobile lift, comprising an upwardly-movable platform over whch an automobile is adapted to be positioned, chassis engaging devices on said platform that are adapted to co-act with the front axle of the automobile that is to be raised, a shiftable cradle on said platform, levers pivotally mounted on said cradle and provided with elements on which a central portion of the rear axle housing of the automobile exerts pressure and thus causes said levers to rock in one direction when the platform moves upwardly, and shiftable anti-tilting members on the cradle operatively connected with said levers.

16. An automobile lift, comprising an upwardly-movable platform over which an automobile is adapted to be positioned, and shiftable anti-tilting members on said platform mounted so that gravity tends to move said members in one direction, said members being adapted to be moved by gravity into an operative position when the platform moves upwardly.

17. In an automobile lift, the combination of an upwardly-movable platform over which an automobile is adapted to be positioned, shiftable wheel engaging members on said platform that are adapted to co-act with one pair of wheels of the automobile to center the automobile with relation to the platform, and a safety mechanism for preventing the automobile from tilting on the platform, operatively connected with said wheel engaging members and adapted to be rendered operative when said wheel engaging members are rendered inoperative, and vice versa.

18. An automobile lift, comprising an upwardly-movable platform over which an automobile is adapted to be positioned, rockable wheel engaging members mounted on said platform, and anti-tilting members rigidly connected with said wheel engaging members and adapted to be shifted into and out of an active position by the movement of said wheel engaging members relatively to the platform.

19. In an automobile lift, the combination of an upwardly-movable platform over which an automobile is adapted to be positioned, front and rear wheel engaging members rockably mounted on the platform, means for operatively connecting the rear wheel engaging members with the front wheel engaging members, and shiftable anti-tilting members on the platform that are rendered active and inactive by the movement of the rear wheel engaging members.

EDWIN H. STEEDMAN.